US010795996B2

(12) United States Patent
Chistyakov et al.

(10) Patent No.: US 10,795,996 B2
(45) Date of Patent: Oct. 6, 2020

(54) SYSTEM AND METHOD OF MACHINE LEARNING OF MALWARE DETECTION MODEL

(71) Applicant: AO Kaspersky Lab, Moscow (RU)

(72) Inventors: Alexander S. Chistyakov, Moscow (RU); Ekaterina M. Lobacheva, Moscow (RU); Alexey M. Romanenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 239 days.

(21) Appl. No.: 15/907,462

(22) Filed: Feb. 28, 2018

(65) Prior Publication Data

US 2019/0018960 A1 Jan. 17, 2019

Related U.S. Application Data

(60) Provisional application No. 62/573,745, filed on Oct. 18, 2017.

(30) Foreign Application Priority Data

Jul. 17, 2017 (RU) ................................ 2017125331

(51) Int. Cl.
*G06F 21/56* (2013.01)
*G06F 21/57* (2013.01)
(Continued)

(52) U.S. Cl.
CPC .......... *G06F 21/565* (2013.01); *G06F 21/552* (2013.01); *G06F 21/566* (2013.01);
(Continued)

(58) Field of Classification Search
CPC ...... G06F 21/55–568; G06F 2221/034; G06N 3/08–088; G06N 20/00–20;
(Continued)

(56) References Cited

U.S. PATENT DOCUMENTS 9,288,220 B2 3/2016 Raugas et al.
2006/0069697 A1 3/2006 Shraim et al.
(Continued)

FOREIGN PATENT DOCUMENTS

EP 1879124 A1 1/2008
JP 2004151863 A 5/2004
WO 2013089771 A1 6/2013

OTHER PUBLICATIONS

Kolosnjaji Bojan et al: "Empowering convolutional networks for malware classification and analysis", 2017 International Joint Conference on Neural Networks (IJCNN), IEEE, May 14, 2017 (May 14, 2017), pp. 3838-3845.

(Continued)

*Primary Examiner* — Kevin Bechtel
(74) *Attorney, Agent, or Firm* — Arent Fox LLP; Michael Fainberg

(57) ABSTRACT

Disclosed are systems and methods for machine learning of a model for detecting malicious files. The described system samples files from a database of files and trains a detection model for detecting malicious files on the basis of an analysis of the sampled files. The described system forms behavior logs based on executable commands intercepted during execution of the sampled files, and generates behavior patterns based on the behavior log. The described system determines a convolution function based on the behavior patterns, and trains a detection model for detecting malicious files by calculating parameters of the detection model using the convolution function on the behavior patterns. The trained detection model may be used to detect malicious files by utilizing the detection model on a system behavior log generated during execution of suspicious files.

21 Claims, 7 Drawing Sheets

(51) Int. Cl.
*G06F 21/55* (2013.01)
*G06N 20/00* (2019.01)

(52) U.S. Cl.
CPC ............. *G06F 21/57* (2013.01); *G06N 20/00* (2019.01); *G06F 2221/034* (2013.01)

(58) Field of Classification Search
CPC ....... H04L 63/14; H04L 63/1408–1425; H04L 63/1441; H04L 63/145
See application file for complete search history.

(56) References Cited

U.S. PATENT DOCUMENTS

2013/0097706 A1* 4/2013 Titonis .................... G06F 21/56
726/24
2017/0193225 A1 7/2017 Moon et al.
2017/0344880 A1* 11/2017 Nekuii ................. G06F 17/142

OTHER PUBLICATIONS

Alam Mohammed S et al: "Random Forest Classification for Detecting Android Malware", 2013 IEEE International Conference on Green Computing and Communications and IEEE Internet of Things and IEEE Cyber, Physical and Social Computing, IEEE, Aug. 20, 2013 (Aug. 20, 2013), pp. 663-669.
Xu Zhixing et al: "Malware detection using machine learning based analysis of virtual memory access patterns", Design, Automation & Test in Europe Conference & Exhibition (DATE), 2017, EDAA, Mar. 27, 2017 (Mar. 27, 2017), pp. 169-174.

* cited by examiner

SYSTEM AND METHOD OF MACHINE LEARNING OF MALWARE DETECTION MODEL

CROSS-REFERENCE TO RELATED APPLICATIONS

This application claims benefit of priority under 35 U.S.C. 119(a)-(d) to a Russian Patent Application No. 2017125331 filed on Jul. 17, 2017, and the benefit of priority under 35 U.S.C. 119(e) to a U.S. Provisional Application No. 62/573,745, filed Oct. 18, 2017, both of which are incorporated herein by reference.

FIELD OF TECHNOLOGY

The present disclosure relates generally to the field of antivirus technologies, more particularly to systems and methods for detecting malicious files.

BACKGROUND

The rapid development of computer technologies in the recent decade, as well as the widespread distribution of various computing devices (personal computers, notebooks, tablets, smartphones, etc.) have become a powerful impetus to the use of such devices in various spheres of activity and an enormous number of problems (from Internet surfing to bank transfers and electronic document traffic). In parallel with the growth in the number of computing devices and the software running on these devices, the number of malicious programs has also increased at a rapid pace.

At present, there exists an enormous number of varieties of malicious programs. Some of them steal personal and confidential data from the users of these devices (such as logins and passwords, banking information, electronic documents). Others form so-called botnets from the devices of users for such attacks as denial of service (DDoS—Distributed Denial of Service) or to sort through passwords by the method of brute force on other computers or computer networks. Still others present paid content to users through intrusive advertising, paid subscriptions, the sending of SMS to toll numbers, and so on.

Specialized programs known as antivirus programs are used in the struggle against malicious programs, including the detection of malicious programs, the prevention of infection, and the restoration of the working capability of computing devices which have been infected with malicious programs. Antivirus programs employ various technologies to detect the full panoply of malicious programs, such as static analysis and dynamic analysis.

Static analysis refers to the analysis of programs for harmfulness, including the execution or emulation of the programs under analysis, on the basis of the data contained in files making up the programs under analysis. During statistical analysis, it is possible to use signature analysis, which is the search for correspondences of a particular segment of code of the programs under analysis to a known code (signature) from a database of signatures of malicious programs, and white and black lists, which involve the search for calculated check sums from the programs under analysis (or portions thereof) in a database of check sums of malicious programs (black lists) or a database of check sums of safe programs (white lists).

Dynamic analysis refers to the analysis of programs for harmfulness on the basis of data obtained in the course of execution or emulation of the working of the programs being analyzed. During dynamic analysis, it is possible to use heuristic analysis, which includes the emulation of the working of the programs being analyzed, the creation of emulation logs (containing data on the calls of API functions, the parameters transmitted, the code segments of the programs being analyzed, and so on), and the search for correspondences between the data of the logs created and the data from a database of behavioral signatures of malicious programs. It is also possible to use proactive protection, which includes intercepting calls of API functions of the launched programs being analyzed, creating logs of the behavior of the programs being analyzed (containing data on the calls of API functions, the parameters transmitted, the code segments of the programs being analyzed, and so on), and searching for correspondences between the data of the logs created and the data from a database of calls of malicious programs.

Both static and dynamic analysis have their pluses and minuses. Static analysis is less demanding of resources of the computing device on which the analysis is being done, and since it does not require the execution or the emulation of the program under analysis, statistical analysis is faster, but at the same time less effective, i.e., it has a lower percentage of detecting malicious programs and a higher percentage of false alarms (i.e., pronouncing a verdict that a file analyzed by the means of the antivirus program is malicious, whereas it is safe). Dynamic analysis, since it uses data obtained during the execution or emulation of the working of the program being analyzed, is slower and makes higher demands on the resources of the computing device on which the analysis is being performed, but at the same time it is also more effective. Modern antivirus programs employ a comprehensive analysis, including elements of both static and dynamic analysis.

Since modern standards of information security require an operative response to malicious programs (especially new ones), automatic means of detecting malicious programs are the main focus of attention. For the effective operation of such means, elements of artificial intelligence and various methods of machine learning of models for the detecting malicious programs (i.e., a set of rules for making a decision as to the harmfulness of a file on the basis of a certain set of input data describing the malicious file) are often used, enabling an effective detection of not only well-known malicious programs or malicious programs with well-known malicious behavior, but also new malicious programs having unknown or little-studied malicious behavior, as well as an operative adaptation (learning) to detect new malicious programs.

Although the known technologies deal well with the detection of malicious files having certain characteristic attributes (i.e., data describing certain features of files from a certain group of files, such as the presence of a graphic interface, data encryption, data transmission through a computer network, and so on) similar to the characteristic attributes of already known malicious files, they are not able to handle the detection of malicious files having different characteristic attributes (albeit similar behavior) from the characteristic attributes of already known malicious files. Furthermore the above-described technology does not disclose such aspects of machine learning of models as the testing and retraining of models, and also the forming and reforming (depending on the results of the aforementioned testing) of characteristic attributes.

The present disclosure makes it possible to solve the problem of machine learning of a model for detecting malicious files.

SUMMARY

Thus, a system and method is disclosed herein for detecting malicious files, and, more particularly, for machine learning of a model for detecting malicious files According to one exemplary aspect of the present disclosure, a method for machine learning of a model for detecting malicious files is provided. The method includes selecting a first file from a database of files as a training sample, generating a behavior log based on executable commands intercepted during execution of the selected first file, and generating a plurality of behavior patterns based on the behavior log. The method further includes determining a convolution function based on the behavior patterns such that an inverse convolution function of a result of the convolution function has a degree of similarity with the generated behavior pattern greater than a specified first value. The method further includes training a detection model for detecting malicious files by calculating a plurality of parameters of the detection model using the convolution function on the behavior patterns, and detecting that a second file is a malicious file using the trained detection model on a system behavior log generated during execution of the second file.

In another aspect, the detection model comprises a set of rules configured to calculate a degree of harmfulness of a target file based on at least one behavior pattern using calculated parameters of the detection model.

In another aspect, generating the behavior log based on the executable commands intercepted during execution of the selected first file further includes intercepting at least one executable command at least during execution of the selected first file or emulation of the execution of the selected first file, determining for each intercepted command at least one parameter describing the command, and generating the behavior log associated with the selected first file based on the intercepted commands and the parameters.

In another aspect, each of the behavior patterns comprise a set of at least one command and a parameter which describes all of the commands of that set.

In another aspect, the convolution function is configured to calculate a feature vector of a behavior pattern as a sum of hash sums of elements of that behavior pattern, wherein the convolution function comprises a hash function such that a degree of similarity of the calculated feature vector and a result of an inverse hash function of the result of that hash function of the calculated feature vector is greater than the specified first value.

In another aspect, the method further includes calculating a degree of harmfulness of the second file based on the behavior log and the detection model, the degree of harmfulness of the second file being a quantitative characteristic describing malicious behavior of the second file.

In another aspect, detecting that the second file is a malicious file using the trained detection model on the system behavior log generated during execution of the second file further includes recording intercepted executable commands and parameters with the intercepted commands into the system behavior log, calculating a coefficient of harmfulness using the trained detection model on the system behavior log, and determining that the second file is a malicious file responsive to determining that the coefficient of harmfulness exceeds a first threshold value.

According to another exemplary aspect, a system for machine learning of a model for detecting malicious files is provided. The system includes a processor configured to select a first file from a database of files as a training sample, generate a behavior log based on executable commands intercepted during execution of the selected first file, generate a plurality of behavior patterns based on the behavior log, determine a convolution function based on the behavior patterns such that an inverse convolution function of a result of the convolution function has a degree of similarity with the generated behavior pattern greater than a specified first value, train a detection model for detecting malicious files by calculating a plurality of parameters of the detection model using the convolution function on the behavior patterns, and detect that a second file is a malicious file using the trained detection model on a system behavior log generated during execution of the second file.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for machine learning of a model for detecting malicious files. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A number of definitions and concepts that will be used in describing variant aspects of the present disclosure will now be introduced.

Malicious file—a file whose execution is known to be able to result in unauthorized destruction, blocking, modification, copying of computer information or neutralization of the means of protection of computer information.

Malicious behavior of an executable file—a group of actions which may be performed during execution of such a file and which are known to be able to result in unauthorized destruction, blocking, modification, copying of information or neutralization of the means of protection of computer information.

Malicious activity of an executable file—a group of actions performed by such a file in accordance with its malicious behavior.

Computing device of the average user—a hypothetical (theoretical) computing device having averaged characteristics of the computing devices of a previously selected group of users on which the same applications are executed as on the computing devices of those users.

Command executable by a computing device—a set of machine instructions or instructions of scripts executable by a computing device on the basis of the parameters of those instructions, known as command parameters or parameters describing said command.

Lexical analysis (tokenizing)—a process of analytical parsing of an input sequence of characters into recognized groups (hereinafter: lexemes), in order to form at the output identification sequences (hereinafter: tokens).

Token—an identification sequence formed from a lexeme in the process of lexical analysis.

Figure 1:
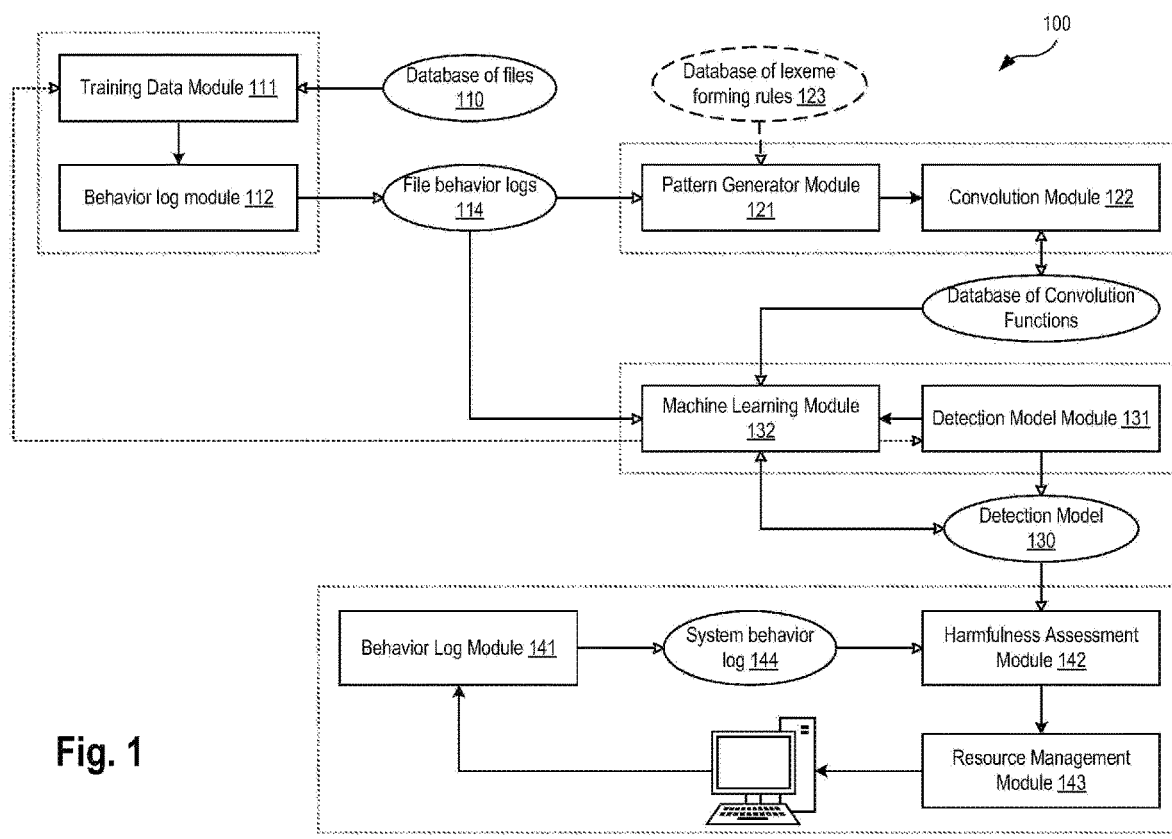
FIG. 1 shows the structural diagram of the system for machine learning of a model for detecting malicious files according to an exemplary aspect.

FIG. 1 shows the structural diagram of a system 100 for machine learning of a model for detecting malicious files. The system 100 for machine learning includes a training data module 111, a behavior log module 112, a pattern generator module 121, a convolution module 122, a detection model module 131, a detection model module 131, a machine learning module 132 a machine learning module 132, a harmfulness assessment module 142, and a resource management module 143.

In one aspect, the mentioned system 100 of machine learning of the detection model has a client-server architecture, in which the training data module 111, the behavior log module 112, the pattern generator module 121, the convolution module 122, the detection model module 131, and the machine learning module 132 work at the server side, and the behavior log module 141, the harmfulness assessment module 142 and the resource management module 143 work on the client side.

For example, the client may be the computing devices of a user, such as a personal computer, notebook, smartphone, and so forth, and the server may be the computing devices of an antivirus company, such as distributed systems of servers by means of which, besides everything else, a preliminary collection and antivirus analysis of files, a creation of antivirus records, and so forth, is done, wherein the system 100 of machine learning of a model for detecting malicious files will be used to detect malicious files at the client side, thereby enhancing the effectiveness of the antivirus protection of that client.

In yet another example, both the client and the server may be the computing devices of the antivirus company alone, wherein the system 100 of machine learning of the model for detecting malicious files will be used for an automated antivirus analysis of files and creation of antivirus records, thereby enhancing the working effectiveness of the antivirus company.

In one aspect, the training data module 111 may be configured to sample at least one file from a database 110 of files in accordance with predetermined rules for generating a learning sample of files, after which the machine learning module 132 will carry out the training the detection model 130 on the basis of an analysis of the sampled files. The training data module 111 may be further configured to send the sampled files to the behavior log module 112.

In one aspect of the system 100, at least one safe file and one malicious file are kept in the database 110 of files. For example, the database 110 of files may keep, as safe files, the files of the Windows operating system, and as malicious files the files of backdoors, applications carrying out unauthorized access to data and remote control of an operating system and a computer as a whole. By training with the mentioned files and using methods of machine learning, the model for detecting malicious files will be able to detect malicious files having a functionality similar to the functionality of the aforementioned backdoors with high accuracy (the higher the accuracy, the more files are used for training the aforementioned detection model).

In yet another aspect of the system, the database 110 of files may additionally keep suspicious files (riskware) and unknown files. Suspicious files refer to files which are not malicious, yet are able to carry out malicious actions. Unknown files refer to files whose harmfulness has not been determined and remains unknown (i.e., files which are not safe, malicious, suspicious, and so forth). For example, the database 110 of files may store, as suspicious files, the application files of remote administration (such as RAdmin), archiving, or data encryption (such as WinZip), and so on.

In yet another aspect of the system, the database 110 of files may keep files collected by antivirus web crawlers and/or files sent in by users. The mentioned files may be analyzed by antivirus experts, including with the help of automatic means of file analysis, in order to then pronounce a verdict as to the harmfulness of such files.

For example, the database of files may keep files sent in by users from their computing devices to the antivirus companies to check their harmfulness, wherein the files transmitted may be either safe or malicious, and the distribution between the number of said safe and malicious files is close to the distribution between the number of all safe and malicious files located on the computing devices of said users. The relationship between the distributions may be expressed by Equation (1) below, where the ratio of the number of said safe files to the number of said malicious files differs from the ratio of the number of all safe files to the number of all malicious files located on the computing devices of said users by a quantity less than a specified threshold value.

$$\left| \frac{N_{clean}}{N_{malware}} - \frac{\forall N_{clean}}{\forall N_{malware}} \right| < \varepsilon \qquad (1)$$

Unlike the files transmitted by the users (i.e., files which are subjectively suspicious), the files collected by antivirus web crawlers which are designed to search for suspicious and malicious files more often prove to be malicious.

In yet another aspect, a number of conditions may be used as the criteria for selecting or sampling files from the database 110 of files. In some aspects, the training data module 111 may select (i.e., samples) files from the database 110 of files such that the distribution between safe and malicious files selected from the database of files corresponds to the distribution between safe and malicious files located on the computing device of the average user. In some aspects, the training data module 111 may select files from the database 110 of files such that the criteria that the distribution between safe and malicious files selected from the database of files corresponds to the distribution between safe and malicious files collected with the help of antivirus web crawlers. In some aspects, the training data module 111 may select files from the database 110 of files such that the parameters of the files selected from the database of files correspond to the parameters of the files located on the computing device of the average user. In some aspects, the training data module 111 may select files from the database 110 such that the number of selected files corresponds to a predetermined value, while the files themselves are selected at random.

For example, the database 110 of files may contain 100,000 files, among which 40% are safe files and 60% are malicious files. From the database of files there are selected 15,000 files (15% of the total number of files being kept in the database of files) such that the distribution between the selected safe and malicious files corresponds to the distribution between the safe and the malicious files located on the computing device of the average user and amounts to 95 to 5. For this purpose, 14,250 safe files (35.63% of the total number of safe files) and 750 malicious files (1.25% of the total number of malicious files) are chosen at random from the database of files.

In yet another example, the database of files contains 1,250,000 files, of which 95% are safe files and 5% are malicious files, i.e., the distribution between the safe and malicious files being kept in the database of files corresponds to the distribution between the safe and the malicious files located on the computing device of the average user. Of these files, 5,000 files are chosen at random, of which ~4,750 prove to be safe files and ~250 malicious files with a high probability.

In yet another aspect, the file parameters (used as criteria for the sampling) may include parameters related to the harmfulness of the file (i.e., characterizing whether the file is safe, malicious, potentially dangerous, or the behavior of the computer system when executing the file is not determined, and so forth), the number of commands performed by the computing device during the execution of the file, the size of the file, and the applications utilizing the file. For example, malicious files are chosen from the database of files which are scripts in the "ActionScript" language, executable by the application "Adobe Flash", and not exceeding 5 kb in size.

In yet another aspect, the training data module 111 may be further configured to sample at least one other file from the database of files in accordance with predetermined rules for generating a test sample of files, after which the machine learning module 132 will carry out a verification of the trained detection model on the basis of an analysis of the sampled files. The training data module 111 may then send the sampled files to the behavior log module 112.

For example, the database of files contains 75,000 files, among which 20% are safe files and 80% are malicious files. First of all, 12500 files are chosen from the database of files, of which 30% are safe files and 70% are malicious files, after which the machine learning module 132 will perform train or teach the detection model 130 on the basis of an analysis of the chosen files, and then select 2,500 files from the remaining 62,500 files, of which 60% are safe files and 40% are malicious files, and after this the machine learning module 132 will perform a verification of the trained detection model on the basis of an analysis of the chosen files. The data formulated in the above-described way is called the cross-validation set of data.

The behavior log module 112 is configured to intercept at least one executable command at least during the execution of the file received and/or the emulation of the execution of the file received, wherein the emulation of the execution of the file includes the opening of the mentioned file (for example, the opening of a script by an interpreter). The behavior log module 112 may be further configured to determine for each intercepted command at least one parameter describing said command, and generate the behavior log 114 of the received file on the basis of the intercepted commands and the parameters so determined. It is noted that the present disclosure may refer to the execution The behavior log 114 constitutes the totality of intercepted commands (hereinafter, the command) from the file, where each command corresponds at least to one parameter so determined and describing that command (hereinafter, the parameter). For example, the commands intercepted during the execution of a malicious file which collects passwords and transmits them via a computer network and the parameters calculated for said commands may look like as follows:

```
CreateFile, 'c:\windows\system32\data.pass'
ReadFile, 0x14ea25f7, 0xf000
connect, http://stealpass.com
send, 0x14ea25f7, 0xf000
```

In one aspect, the behavior log module 112 may intercept commands from the file with the aid of a specialized driver, a debugger, a hypervisor, or other implementations. For example, the behavior log module 112 may use a specialized driver which utilizes an interception by splicing of the entry point of a WinAPI function to intercept commands during the execution of the file and to determine the parameters. In yet another example, the interception of commands during the emulation of the working of a file is done directly by an emulator performing said emulation, which determines the parameters of the command needing to be emulated. In yet another example, the behavior log module 112 may intercept commands during the execution of the file on a virtual machine using the hypervisor, which determines the parameters of the command needing to be emulated.

In one aspect, the intercepted commands from the file may include one or more API (Application Programming Interface) functions, or sets of machine instructions describing a predetermined set of actions (macro commands).

For example, malicious programs very often perform a search for certain files and modify their attributes, for which they employ a sequence of commands such as:

```
FindFirstFile, 'c:\windows\system32\*.pass', 0x40afb86a
SetFileAttributes, 'c:\windows\system32\data.pass'
FindNextFile, 0x40afb86a
CloseHandle, 0x40afb86a,
``` which may in turn be described by only a single command:
_change_attributes, 'c:\windows\system32\*.pass'

In yet aspect, each command is matched up with its unique identifier. For example, all WinAPI functions may be matched up with numbers in the range of 0x0000 to 0x8000, where each WinAPI function corresponds to a unique number (for example, ReadFile→0x00f0, ReadFileEx→0x00f1, connect→0x03A2). In yet another aspect, several commands describing similar actions are matched up with a single identifier. For example, all commands such as ReadFile, ReadFileEx, ifstream, getline, getchar and so forth, which describe a reading of data from a file, are matched up with an identifier _read_data_file (0x70F0).

In one aspect, the pattern generator module 121 may be configured to generate at least one behavior pattern on the basis of the commands and parameters selected from the behavior log 114. The behavior log 114 constitutes the totality of executable commands (hereinafter, the command) from the file, where each command corresponds at least to one parameter describing that command (hereinafter, the parameter), the behavior pattern being a set of at least one command and a parameter which describes all of the commands of that set (hereinafter, the elements of the behavior pattern). The pattern generator module 121 may be further configured to send the behavior patterns so formed to the convolution module 122.

For example, from the behavior log 114, the following commands $c_i$ and parameters $p_i$ are selected:

$\{c_1, p_1, p_2, p_3\}$,
$\{c_2, p_1, p_4\}$,
$\{c_3, p_5\}$,
$\{c_2, p_5\}$,
$\{c_1, p_5, p_6\}$,
$\{c_3, p_2\}$.

On the basis of the chosen commands and parameters, behavior patterns are formed containing one command each and one parameter describing that command:

$\{c_1, p_1\}$, $\{c_1, p_2\}$, $\{c_1, p_3\}$, $\{c_1, p_5\}$, $\{c_1, p_6\}$,
$\{c_2, p_1\}$, $\{c_2, p_4\}$, $\{c_2, p_5\}$,
$\{c_3, p_2\}$, $\{c_3, p_5\}$.

Next, on the basis of the patterns so formed, additional behavior patterns are formed, containing one parameter each and all the commands which are described by that parameter:

$\{c_1, c_2, p_1\}$,
$\{c_1, c_3, p_2\}$,
$\{c_1, c_2, c_3, p_5\}$.

After this, on the basis of the patterns so formed, behavior patterns are additionally formed, containing several parameters each and all the commands which are described by those parameters at the same time:

$\{c_1, c_2, p_1, p_5\}$.

In one aspect, the pattern generator module 121 may choose the commands and parameters from the behavior log 114 on the basis of rules by which are selected at least: every i-th command in succession and the parameters describing it, the increment i being predetermined; the commands executed after a predetermined period of time (for example, every tenth second) from the previous selected command, and describing its parameters; the commands and the parameters describing them that are executed in a predetermined time interval from the start of execution of the file; the commands from a predetermined list and the parameters describing them; the parameters from a predetermined list and the commands described by those parameters; and the first or the random k parameters of commands in the case when the number of command parameters is greater than a predetermined threshold value.

For example, from the behavior log 114, one selects all the commands for working with a hard disk (such as CreateFile, ReadFile, WriteFile, DeleteFile, GetFileAttribute and so on) and all the parameters describing the chosen commands. In yet another example, from the behavior log 114, one selects every thousandth command and all the parameters describing the selected commands.

In one variant aspect, the behavior logs 114 are formed in advance from at least two files, one of which is a safe file and the other a malicious file.

In yet another variant aspect, each element of the behavior pattern is matched up with a characteristic such as the type of element of the behavior pattern. The type of element of the behavior pattern (command or parameter) may be a "number range", if the element of the behavior pattern can be expressed as a number. For example, for an element of the behavior pattern constituting the parameter $port_{html}=80$ of the connect command, the type of said element of the behavior pattern may be a "number value from 0x0000 to 0xFFFF". In some aspects, the type of element of the behavior pattern (command or parameter) may be a "string", if the element of the behavior pattern can be expressed in the form of a string. For example, for an element of the behavior pattern constituting the connect command, the type of said element of the behavior pattern may be a "string less than 32 characters in size". In some aspects, if the element of the behavior pattern can be expressed in the form of data described by a predetermined data structure, the type of that element of the behavior pattern may be a "data structure." For example, for an element of a behavior pattern constituting the parameter src=0x336b9a480d490982cdd93e2e49f deca7 of the find record command, the type of this element of the behavior pattern may be the "data structure MD5".

In yet another aspect, the behavior pattern additionally includes, as elements of the behavior pattern, tokens formed on the basis of lexical analysis of said elements of the behavior pattern with the use of at least predetermined rules for the formation of lexemes (e.g., stored in a database 123), or a previously trained recurrent neural network. For example, with the aid of lexical analysis of the parameter 'cc:\windows\system32\data.pass', on the basis of the following rules for generating lexemes: if the string contains the path to a file, determine the disk on which the file is located; if the string contains the path to a file, determine the folders in which the file is located; if the string contains the path to a file, determine the file extension. In this example, the lexemes may include the paths to the file, the folders in which the files are located, the names of the files, and the extensions of the files. From the above-listed rules, the tokens can be formed:

"paths to the file" →
  'c:\',
"folders in which the files are located" →
  'windows',
  'system32',
  'windows\system32',
"extensions of the files" →
  '.pass'.

In yet another example, with the aid of lexical analysis of the parameters '81.19.82.8', '81.19.72.38', '81.19.14.32', on the basis of the following rule for generating lexemes: if the parameters constitute IP addresses, determine the bit mask (or its analog, expressed by metacharacters) describing said IP addresses (i.e., the bit mask M for which the equality $M \wedge IP = const$ is true for all said IPs). From this rule, the token can be formulated as: '81.19.*.*'.

In yet another example, from all available parameters comprising numbers, the tokens of the numbers are formed in predetermined ranges:

23, 16, 7224, 6125152186, 512, 2662162, 363627632, 737382, 52, 2625, 3732, 812, 3671, 80, 3200 sorting is done by ranges of numbers:

```
from 0 to 999
    → {16, 23, 52, 80, 512, 812},
from 1000 to 9999
    → {2625, 3200, 3671, 7224},
from 10000
    → {737382, 2662162, 363627632, 6125152186}
```

In yet another aspect, tokens are formed from elements of a behavior pattern which are comprised of strings. For example, the behavior pattern is a path to a file containing the names of the disk, the directory, the file, the file extension, and so forth. In this case, the token may be the name of the disk and the file extension.

```
C:\Windows\System32\drivers\acpi.sys
    →
C:\
*.sys
```

In one aspect of the present disclosure, the convolution module 122 is configured to generate a convolution function from the behavior pattern. In some aspects, the convolution module 122 may send the convolution function so formed to the machine learning module 132. In some aspects, the convolution module 122 may generate a convolution function such that the inverse convolution function of the result of that convolution function on the obtained behavior pattern will have a degree of similarity with the obtained behavior pattern greater than a specified value, i.e., as represented by Equation (2) below:

$$r \sim g^{-1}(g(r)) \quad (2)$$

where:
$r_i$ is the behavior pattern,
g is the convolution function,
$g^{-1}$ is the inverse convolution function.

In one aspect, the convolution module 122 may be further configured to calculate the feature vector of a behavior pattern on the basis of the obtained behavior pattern. In some aspects, the feature vector of the behavior pattern may be expressed as the sum of the hash sums of the elements of the behavior pattern. The convolution module 122 may be further configured to form a convolution function from the feature vector of the behavior pattern. The convolution function may constitute a hash function such that the degree of similarity of the calculated feature vector and the result of the inverse hash function of the result of that hash function of the calculated feature vector is greater than a predetermined value.

In another aspect, the convolution function is formed by a metric learning method (i.e., the task of learning a distance function over objects), such that the distance between the convolutions obtained with the aid of the convolution function for behavior patterns having a degree of similarity greater than a predetermined threshold value is less than a predetermined threshold value, while for behavior patterns having a degree of similarity less than the predetermined threshold value it is greater than the predetermined threshold value.

For example, the convolution module 122 may calculate the feature vector of the behavior pattern as follows. First, an empty bit vector is created, having 100,000 elements (where one bit of information is reserved for each element of the vector). Next, 1,000 elements from the behavior pattern r are set aside for storing of data about the commands $c_i$, the remaining 99,000 elements are set aside for the parameters $c_i$ from the behavior pattern r. And 50,000 elements (from element 1,001 to element 51,000) are set aside for string parameters and 25,000 elements (from element 51,001 to element 76,000) for number parameters. Each command $c_i$ of the behavior pattern r is matched up with a certain number $x_i$ from 0 to 999, and the corresponding bit is set in the created vector $v[x_i]$=true. For each parameter $p_i$ of the behavior pattern r the hash sum is calculated by the Equations (3)-(5):

$$\text{for strings: } y_i = 1001 + crc32(p_i)(\bmod 50000) \quad (3)$$

$$\text{for numbers: } y_i = 51001 + crc32(p_i)(\bmod 25000) \quad (4)$$

$$\text{for others: } y_i = 76001 + crc32(p_i)(\bmod 24000), \quad (5)$$

and depending on the calculated hash sum, the corresponding bit is set in the created vector $v[y_i]$=true. The described bit vector with the elements so set constitutes the feature vector of the behavior pattern r.

In yet another aspect, the feature vector of the behavior pattern may be computed by the following formula shown in Equation (6):

$$D = \sum_i b^i \times h(r_i), \quad (6)$$

where b is the base of the positional system of computation (for example, for a binary vector b=2, for a vector representing a string, i.e., a group of characters, b=8); $r_i$ is the i-th element of the behavior pattern, h is the hash function, where $0 \le h(r_i) < b$.

For example, the feature vector of the behavior pattern may be computed as follows. First, yet another empty bit vector is created (different from the previous example), comprised of 1,000 elements (where one bit of information is reserved for each element of the vector). Next, the convolution module 122 calculate the hash sum for each pattern element $r_i$ of the behavior pattern r by the Equation (7):

$$x_i = 2^{crc32(r_i)(\bmod\ 1000)} \quad (7),$$

and depending on the computed hash sum, set the corresponding bit in the created vector $v[x_i]$=true.

In yet another aspect, the feature vector of the behavior pattern constitutes a Bloom filter. For example, the feature vector of the behavior pattern may be computed as follows. First, yet another empty vector is created (different from the previous examples), comprised of 100,000 elements. Next, at least two hash sums are calculated for each pattern element $r_i$ of the behavior pattern r by means of a set of hash functions $\{h_j\}$ by the formula of Equation (8):

$$x_{ij} = h_j(r_i) \quad (8)$$

where:

$h_j(r_i) = crc32(r_i),$ $h_j(0) = const_j$ and depending on the computed hash sums, set the corresponding elements in the created vector $v[x_{ij}]$=true.

In yet another aspect, the size of the result of the formulated convolution function of the feature vector of the behavior pattern is less than the size of said feature vector of the behavior pattern. For example, the feature vector constitutes a bit vector containing 100,000 elements, and thus has a size of 12500 bytes, while the result of the convolution function of said feature vector constitutes a set of 8 MD5 hash sums and thus has a size of 256 bytes, i.e., ~2% of the size of the feature vector.

In yet another aspect, the degree of similarity of the feature vector and the result of the inverse hash function of the result of said hash function of the calculated feature vector constitutes a number value in the range of 0 to 1 and is calculated by the formula of Equation (9):

$$w = \frac{\sum (\{h(r_i)\} \wedge \{g_i\})}{\sum \{h(r_i)\}} \qquad (9)$$

$$\{h(r_i)\} \wedge \{g_i\} \vee \{h(r_i)\} = \{g_i\},$$

where $h(r_i) \wedge g_i$ signifies the concurrence of $h(r_i)$ with $g_i$, and $\{h(r_i)\}$ is the set of results of the hash functions of the elements of the behavior pattern, $\{g_i\}$ is the set of results of the inverse hash function of the result of the hash function of the elements of the behavior pattern, $r_i$ is the i-th element of the behavior pattern, h is the hash function, and w is the degree of similarity.

Figure 5:
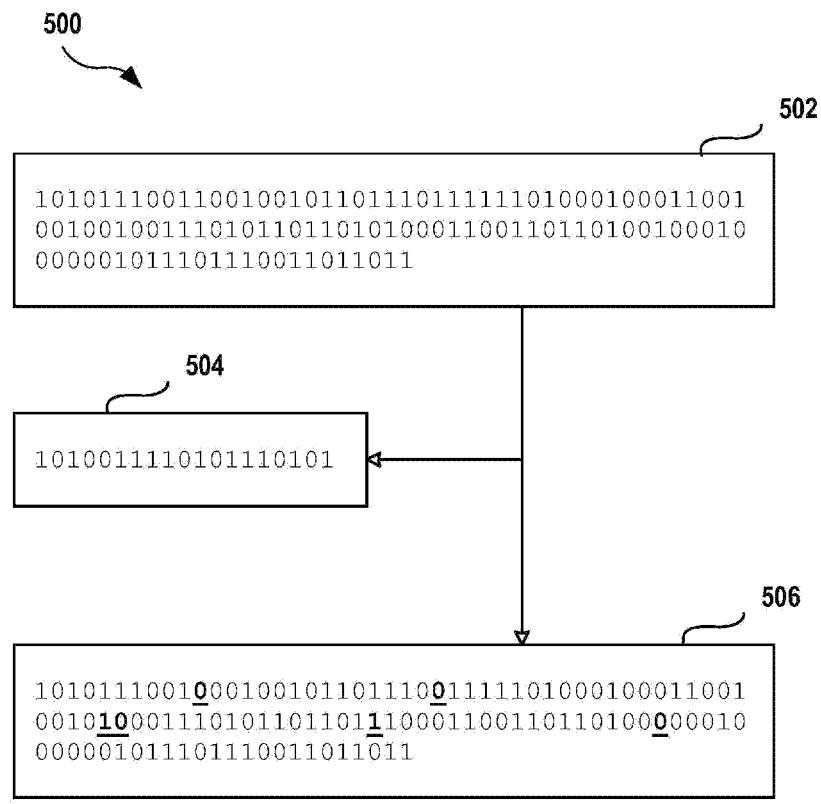
FIG. 5 shows an example of a calculated feature vector according to an exemplary aspect.

An example calculated feature vector is shown in FIG. 5. For example, the calculated feature vector constitutes the bit vector 502:
101011100110010010110111011111101000100
01100100100100111010110110101010001100
110110100100010000001011101110011011011,
the result 504 of the convolution function of this feature vector is "1010011110101110101", and the result 506 of the inverse convolution function of the above-obtained result is
10101110010001001011011100111111101000100
01100100101000111010110110110001100
11011010000001000000010111011100110111011
(where the bold typeface and underline shown in FIG. 5 denote elements different from the feature vector). Thus, the similarity of the feature vector and the result of the inverse convolution function is 0.92.

Referring back to FIG. 1, in yet another aspect, the aforementioned hash function using an element of the behavior pattern as a parameter may depend on the type of element of the behavior pattern $h(r_i)=h_{r_i}(r_i)$. For example, in order to compute the hash sum of a parameter from the behavior pattern constituting a string containing the path to the file, the hash function CRC32 is used; for any other string, the Hoffman algorithm; for a data set, the hash function MD5.

In yet another aspect, the generation of the convolution function of the feature vector of a behavior pattern may be done by an autoencoder, where the input data are the elements of that feature vector of the behavior pattern, and the output data are data having a coefficient of similarity to the input data greater than a predetermined threshold value.

The detection model module 131 may be configured to create a detection model 130 for malicious files based on the parameters of the files selected by the training data module 111. To create the detection model, the detection model module 131 may select a method for machine learning the detection model 130, and initialize the parameters of the training model. The parameters of the training model initialized prior to the start of the machine learning of the detection model are known as hyperparameters. The detection model module 131 may be further configured to send the created training model to the machine learning module 132.

For example, when selecting the method for machine learning of the detection model, at first the detection model module 131 determines whether to use as the detection model an artificial neural net or a random forest. If the random forest (also referred to as random decision forest) is chosen, the detection model module 131 selects the separating criterion for the nodes of the random forest. If an artificial neural net (also referred to as artificial neural networks, or ANNs) is chosen, then the detection model module 131 may select the method of numerical optimization of the parameters of the artificial neural net. In some aspects, the decision as to the choice of a particular method for machine learning may be made on the basis of the effectiveness of that method in the detection of malicious files (i.e., the number of errors of the first and second kind occurring when detecting malicious files) with the use of input data (behavior patterns) of a predetermined kind (i.e., the data structure, the number of elements of the behavior patterns, the performance of the computing device on which the search is conducted for malicious files, the available resources of the computing device, and so on).

In yet another example, the detection model module 131 may select the method for machine learning the detection model on the basis of at least cross-checking, sliding check, cross-validation (CV); mathematical validation of the criteria AIC (Akaike information criterion), BIC (Bayesian information criterion), and so on; A/B testing, split testing; and stacking. In yet another example, in the event of poor performance of the computing device, the method using random forests are chosen, otherwise the method using artificial neural net is chosen.

In one aspect, machine learning is performed for a previously created untrained detection model (i.e., a detection model in which the parameters of that model cannot produce, on the basis of analysis of the input data, output data with accuracy higher than a predetermined threshold value).

In yet another aspect, the method of machine learning the detection model 130 may include decision tree-based gradient boosting, decision trees, a K-nearest neighbor method, a support vector machine (SVM), or other suitable methods.

In yet another aspect, the detection model module 131 is further configured to create a detection model 130 on demand from the machine learning module 132, where certain hyperparameters and methods of machine learning are chosen to be different from the hyperparameters and machine learning methods chosen for a previous detection model.

According to one aspect, the machine learning module 132 is configured to train the detection model 130 for detecting malicious files, in which the parameters of the detection model are computed with the use of the obtained convolution function on the obtained behavior patterns. The detection model 130 may constitute a set of rules for computing the degree of harmfulness of a file on the basis of at least one behavior pattern with the use of the computed parameters of the detection model. In some aspects, the degree of harmfulness of a file constitutes a numerical value from 0 to 1, where 0 means that the file is safe, and 1 that it is malicious. In one example, the detection model 130 may be trained with a known set of files chosen by the training data module 111, wherein said set of files contains 60% safe files and 40% malicious files.

In yet another aspect, a method of training the detection model 130 is chosen which ensures a monotonic change in the degree of harmfulness of a file in dependence on the change in the number of behavior patterns formed on the basis of analysis of the behavior log. In some aspects, a monotonic change in the degree of harmfulness of a file means that, upon analyzing each subsequent behavior pattern, the calculated degree of harmfulness will be not less than the previously calculated degree of harmfulness. For example, after analysis of the 10th behavior pattern, the calculated degree of harmfulness is equal to 0.2; after analysis of the 50th behavior pattern, it is 0.4; and after analysis of the 100th behavior pattern it is 0.7.

In another aspect, the machine learning module 132 is further configured to perform a check of the trained detection model 130 on the obtained behavior logs formed on the basis of analysis of files from a test sample of files, in order to determine the correct determination of the harmfulness of files from the test sample of files. In the event of a negative result of the check, the machine learning module 132 may be configured to send a request to the training data module 111 to prepare a sample of files different from the current one used for training the detection model. In other aspects, responsive to a negative result, the machine learning module 132 may send a request to the detection model module 131 to create a new detection model, different from the current one.

The checking of the trained detection model involves the following process. The detection model 130 has been trained on the basis of a set of files selected by the training data module 111 for which it was known whether they are safe or malicious. In order to verify that the model 130 for detecting malicious files has been trained correctly, i.e., that detection model is able to detect malicious files and pass over safe files, a checking of this model is performed.

For this purpose, the detection model 130 is used to determine whether files from another set of files selected by the training data module 111 are malicious, it being known in advance whether those files are malicious. Thus, one determines how many malicious files were "missed" and how many safe files were detected. If the number of missed malicious files and detected safe files is greater than a predetermined threshold value, that detection model is considered to be improperly trained and a repeat machine learning needs to be done for it (for example, on another training sample of files, using values of the parameters of the detection model different from the previous ones, and so forth).

For example, when performing the check for the trained model, one checks the number of errors of the first and second kind in the detection of malicious files from a test sample of files. If the number of such errors is greater than a predetermined threshold value, a new training and testing sample of files is selected and a new detection model is created.

In yet another example, a training sample of files contained 10000 files, of which 8500 were malicious and 1500 were safe. After the detection model was trained, it was checked on a test sample of files containing 1200 files, of which 350 were malicious and 850 were safe. According to the results of the check performed, 15 out of 350 malicious files failed detection (4%), while 102 out of 850 safe files (12%) were erroneously considered to be malicious. In the event that the number of undetected malicious files exceeds 5% or accidentally detected safe files exceeds 0.1%, the trained detection model is considered to be improperly trained.

In one aspect, during a detection phase, the behavior log module 141 may be configured to intercept at least one executable command at least during the execution of a file for which it is necessary to pronounce a verdict as to the harmfulness or safety of that file. The behavior log module 141 may be further configured to determine for each intercepted command at least one parameter describing said command, and generate a system behavior log 144 of the received file on the basis of the intercepted commands and the parameters so determined. The behavior log module 141 may be configured similar to the behavior log module 112 described above. That is, when learning a model for detecting malicious files and when malicious files are detected at one of the initial stages, the behavior log of the analyzed file is generated. A log is generated using the behavior log generation tool 112, which can be the same tool with the same functionality in both the learning phase and the detection phase. In some aspects, the behavior log module 141 may be separate instance of the behavior log module 112 (except running on client-side), or in other aspects, a same instance.

In one aspect, a system behavior log 144 may be generated based on a previously formed system behavior log and commands intercepted after the forming of said behavior log of the system. For example, after the start of the execution of a file for which it is necessary to pronounce a verdict as to the harmfulness or safety of that file, the behavior log module 141 may record the intercepted executable commands and the parameters describing them in the system behavior log 144. On the basis of an analysis of these commands and parameters, a coefficient of harmfulness of that file is calculated. If no verdict was pronounced as to the file being malicious or safe based on the results of the analysis, the interception of commands may be continued. The intercepted commands and the parameters describing them are recorded in the old behavior log or in a new behavior log. In the first case, the coefficient of harmfulness is calculated on the basis of an analysis of all commands and parameters recorded in the behavior log, i.e., even those previously used to calculate the coefficient of harmfulness.

According to one aspect, the harmfulness assessment module 142 may be configured to calculate the degree of harmfulness on the basis of the system behavior log 144 obtained from the behavior log module 141 and the detection model 130 obtained from the machine learning module 132. In some aspects, the degree of harmfulness of a file may be represented as a quantitative characteristic describing the malicious behavior of the executable file (for example, lying in the range from 0—the file has only safe behavior—to 1—the file has predetermined malicious behavior). In some aspects, the harmfulness assessment module 142 may send the calculated degree of harmfulness to the resource management module 143.

The resource management module 143 is configured to allocate computing resources of the computer system on the basis of the analysis of the obtained degree of harmfulness for use in ensuring the security of the computer system. In one aspect, the computing resources of the computer system include a volume of free RAM; a volume of free space on the hard disks; and the free processor time (quanta of processor time) which can be spent on the antivirus scan (for example, with a greater depth of emulation).

In some aspects, the analysis of the degree of harmfulness includes determining the dynamics of the change in the value of the degree of harmfulness after each of the preceding calculations of the degree of harmfulness, and performing a resource management action. In some aspects, the resource management action may include allocating additional resources of the computer system in the event of an increase in the value of the degree of harmfulness. In other aspects, the resource management action includes freeing up previously allocated resources of the computer system in the event of a decrease in the value of the degree of harmfulness.

Figure 2:
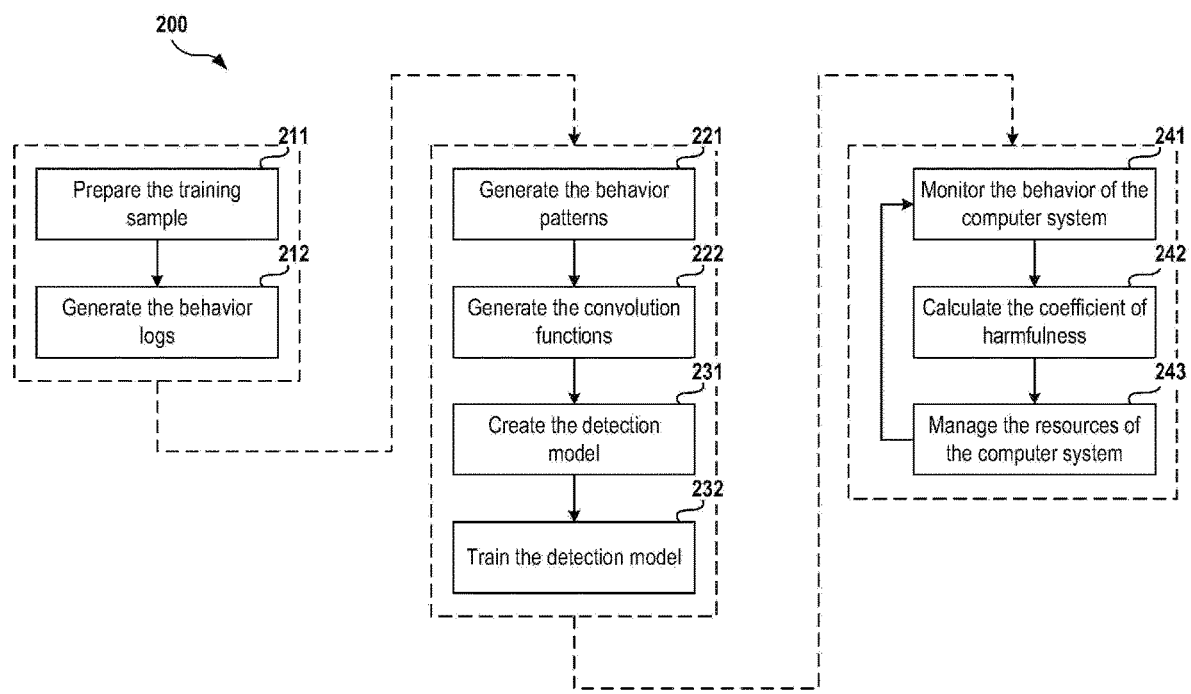
FIG. 2 shows the structural diagram of the method for machine learning of a model for detecting malicious files according to an exemplary aspect.

FIG. 2 shows the structural diagram of a method 200 for machine learning of a model for detecting malicious files. The structural diagram of the method for machine learning of a model for detecting malicious files contains a step 211 in which training samples of files are prepared, a step 212 in which behavior logs are formed, a step 221 in which behavior patterns are formed, a step 222 in which convolution functions are formed, a step 231 in which a detection model is created, a step 232 in which the detection model is trained, a step 241 in which the behavior of the computer system is monitored, a step 242 in which the degree of harmfulness is calculated, and a step 243 in which the resources of the computer system are managed.

In step 211, the training data module 111 selects at least one file from a database of files according to predetermined criteria, wherein the training of the detection model will be done in step 232 on the basis of the selected files.

In step 212, the behavior log module 112 intercepts at least one command at least during the execution of the file selected in step 211, and/or the emulation of the working of the file selected in step 211. The behavior log module 112 may further determine, for each intercepted command, at least one parameter describing that command, and to generate a behavior log of the obtained file based on the commands intercepted and the parameters determined. The behavior log represents a set of intercepted commands (hereinafter, the command) from the file, and each command may correspond to at least one defined parameter describing that command (hereinafter, the parameter).

In step 221, the pattern generator module 121 generates at least one behavior pattern on the basis of the commands and parameters selected from the behavior log formed in step 212, where the behavior log represents a set of executable commands (hereinafter, the command) from the file, where each command corresponds to at least one parameter describing that command (hereinafter, the parameter), the behavior pattern being a set of at least one command and a parameter which describes all the commands from that set.

In step 222, the convolution module 122 generates a convolution function of the behavior pattern formed in step 221 so that the inverse convolution function of the result of this convolution function on the aforementioned behavior pattern will have a degree of similarity to the aforementioned behavior pattern greater than a specified value.

In step 231, the detection model module 131 crates a detection model 130, for which at least a method of machine learning of the detection model is selected, and the parameters of the training model are initialized, in dependence on the parameters of the files selected in step 211. The parameters of the training model initialized prior to the start of the machine learning of the detection model are known as hyperparameters.

In step 232, the machine learning module 132 trains the detection model created in step 231, in which the parameters of that detection model are calculated with the use of the convolution function formed in step 222, on the behavior patterns formed in step 221, where the detection model 130 constitutes a set of rules for calculating the degree of harmfulness of a file on the basis of at least one behavior pattern with the use of the calculated parameters of that detection model.

In step 241, the behavior log module 141 (configured to monitor system behavior) is used to intercept at least one command being executed by the files running in the computer system, and generate a system behavior log 144 on the basis of the intercepted commands. In step 242, the harmfulness assessment module 142 calculates the degree of harmfulness on the basis of the behavior log of the system, formed in step 241, and the detection model trained in step 232.

In some aspects, the system may detect that a second file is a malicious file using the trained detection model on a system behavior log generated during execution of the second file. For example, the behavior log module 141 may, during execution of a target (second) file, record intercepted executable commands and parameters with the intercepted commands into the system behavior log. the harmfulness assessment module 142 may calculate a coefficient of harmfulness associated with the second file using the trained detection model on the system behavior log. The harmfulness assessment module 142 may determine that the second file is a malicious file responsive to determining that the coefficient of harmfulness exceeds a first threshold value.

In step 243, the resource management module 143 allocates computing resources on the basis of the analysis of the degree of harmfulness as calculated in step 242 for use in ensuring the security of the computer system.

Figure 3A:
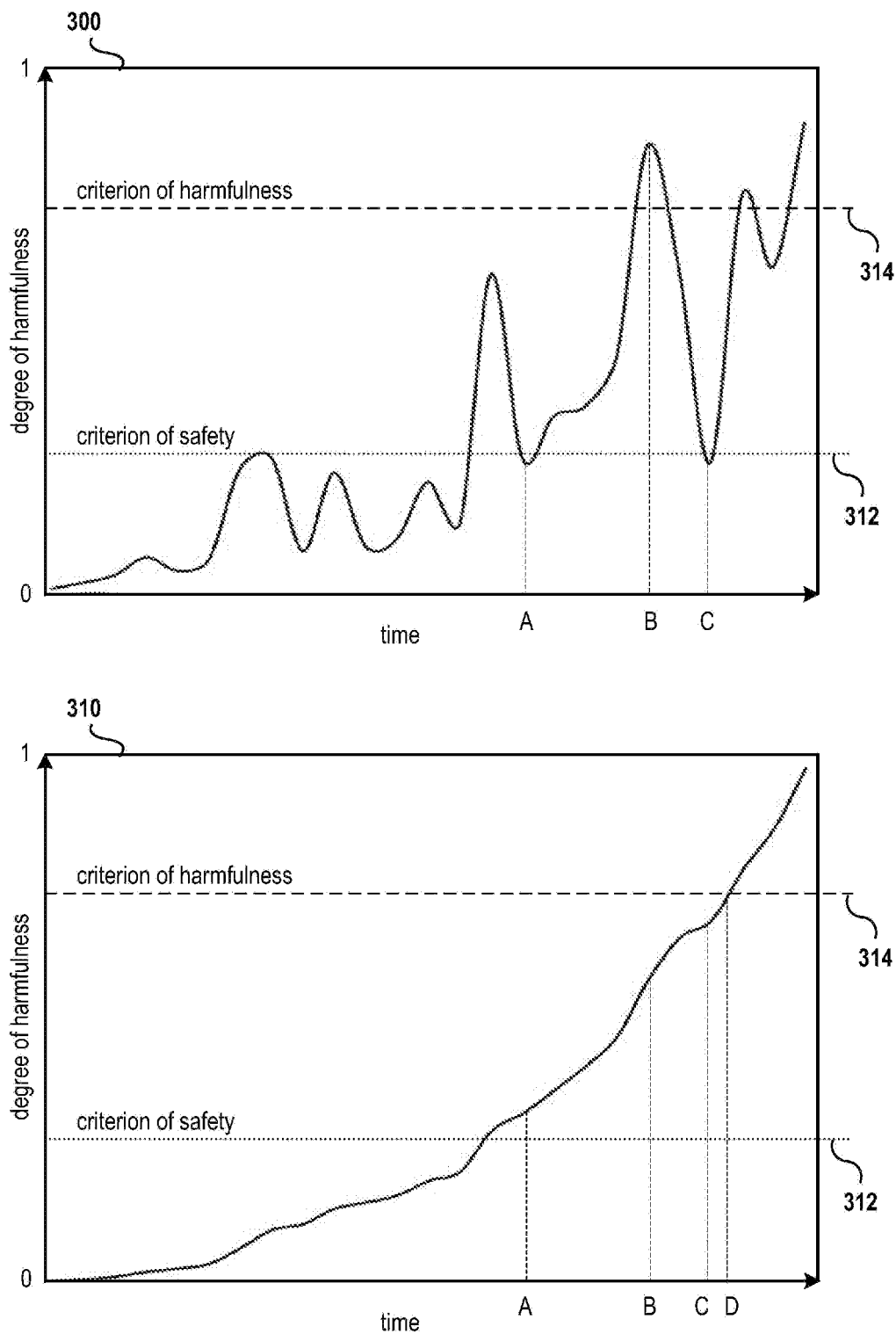
FIGS. 3A and 3B show examples of the dynamics of changing the degree of harmfulness as a function of the number of behavior patterns according to an exemplary aspect.
Figure 3B:
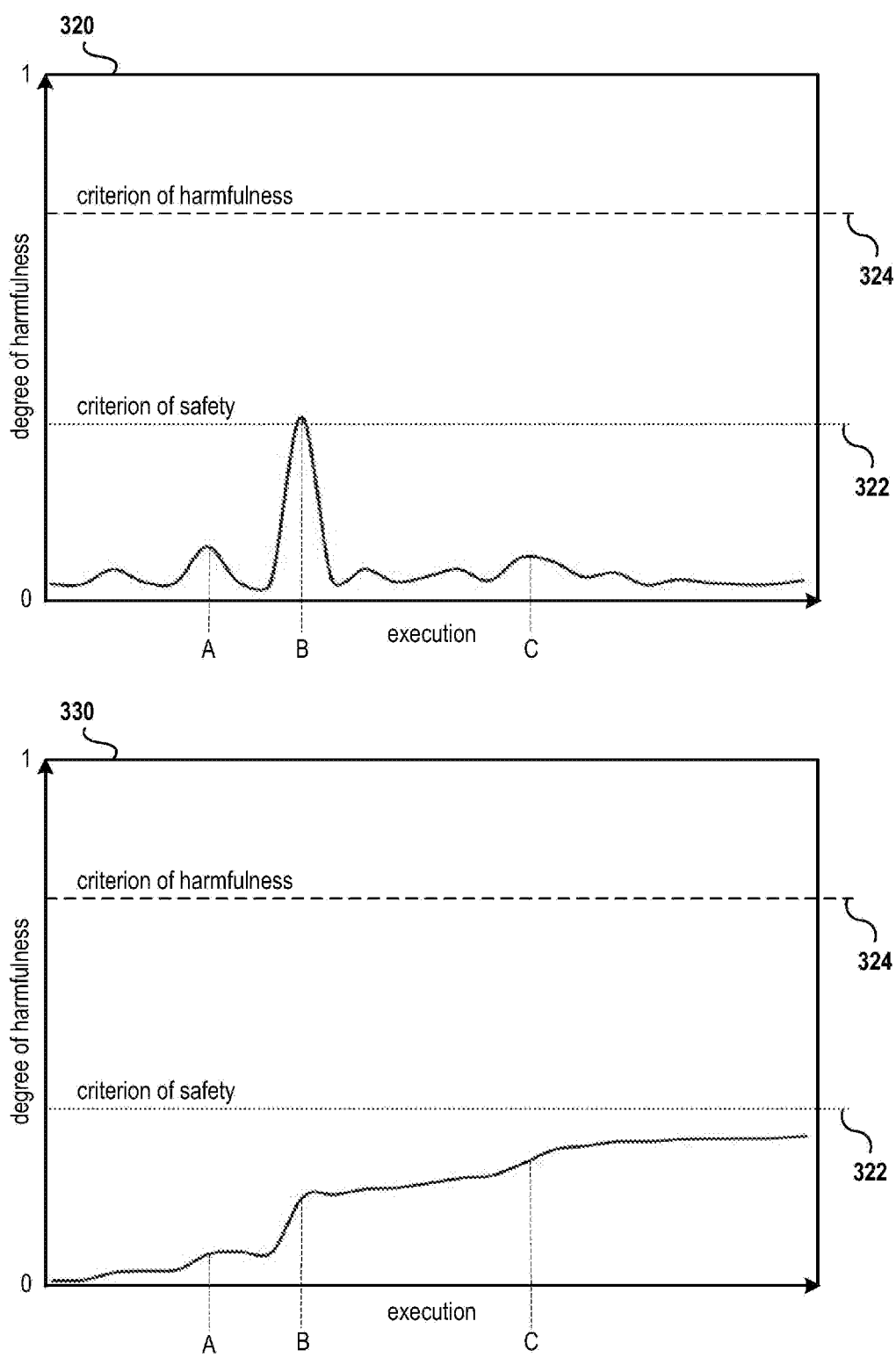

FIGS. 3A and 3B show examples of the dynamics of changing the degree of harmfulness as a function of the number of behavior patterns according to an exemplary aspect. The depicted examples include a graph 300 of the dynamics of an arbitrary change in the degree of harmfulness as a function of the number of behavior patterns formed during the execution of a malicious file, and a graph 310 of the dynamics of monotonic change in the degree of harmfulness as a function of the number of behavior patterns formed during the execution of a malicious file. The depicted examples further include a graph 320 of the dynamics of an arbitrary change in the degree of harmfulness as a function of the number of behavior patterns formed during the execution of a safe file, and a graph 330 of the dynamics of monotonic change in the degree of harmfulness as a function of the number of behavior patterns formed during the execution of a safe file.

In one aspect, the degree of harmfulness of an executable file takes on a value in the range of 0 (i.e., the file has absolutely safe behavior) to 1 (i.e., the file has predetermined malicious behavior). In the graphs of FIGS. 3A and 3B, the degree of harmfulness of an executable file is shown as a function of some incremental value (i.e., the X-axis) representing execution of a file. That is, the X-axis may be comprised of a plurality of points whose incremental characteristic describes the operation of the analyzed file. For example, the degree of harmfulness of an executable file may be graphed as a function of a sequence number of the executable commands, operations, or API functions performed during execution of the file. In another example, the degree of harmfulness of an executable file may be graphed as a function of time during execution, where t=0 is the time of initiating execution of the analyzed file. In yet another example, the degree of harmfulness of an executable file may be graphed as a function of consumable resources (for example, RAM, even if it is released) used during execution of the file.

It is noted that the some of the above characteristics are not necessarily linearly increasing, for example, if the time value is plotted on the X-axis, there may be different intervals between neighboring points (e.g., somewhere the operations took less time; elsewhere, more time). But if the X-axis contains the ordinal number of the operations performed, the interval between adjacent operations may always be the same (i.e., 1 command). As such, it may be necessary to consider additional parameters when considering constraints, or when to make a certain verdict. For example, the system may be configured to use a particular time interval (⊠T), or a combination of a threshold time interval has passed (⊠T) and a threshold amount of resources have been consumed, etc.

As shown in FIG. 3A, the graph 300 illustrates the dynamics of an arbitrary change in the degree of harmfulness as a function of the number of behavior patterns formed during the execution of a malicious file. In the beginning, upon executing said file, the number of behavior patterns formed is not large, and moreover, the malicious activity of the executable file might be absent or minimal. For example, an initialization of data occurs, which is peculiar to many files, including safe ones. As such, the calculated degree of harmfulness differs slightly from 0 and does not exceed the predetermined threshold value (hereinafter, a "criterion of safety"), but upon exceeding this the behavior of the executable file ceases to be considered safe (in the graph, this threshold value is designated by a broken line 312).

However, in time the malicious activity of the executable file grows and the degree of harmfulness begins to approach 1, surpassing the criterion of safety, while the degree of harmfulness might not reach the predetermined threshold value (hereinafter, the criterion of harmfulness), but upon exceeding this the behavior of the executable file will be considered to be malicious (in the graph, this threshold value is designated by a dashed line 314).

After a period of growth, the malicious activity may cease and the degree of harmfulness will again approach 0 (point A). At a certain point, the degree of harmfulness will become greater than the criterion of harmfulness (point B) and the behavior of the executable file will be recognized as malicious and consequently the file itself will be recognized as malicious.

The point of recognizing the file as malicious might occur significantly later than the start of growth in malicious activity, since the described approach responds well to a dramatic growth in the degree of harmfulness, which occurs most often during prolonged, clearly manifested malicious activity of the executable file.

In the event that the malicious activity occurs episodically (left side of the graph 300), the calculated degree of harmfulness might not reach the value after which a verdict is pronounced as to the harmfulness of the behavior of the executable file, and consequently the harmfulness of the executable file itself.

In the case when the degree of harmfulness is calculated not on the basis of each behavior pattern formed (for example, because the performance of the computing device is low), a situation is possible where the degree of harmfulness will be calculated at point A (when the malicious activity commences) and point C (when the malicious activity ends), but will not be calculated at point B (when malicious activity is occurring), so that the calculated degrees of harmfulness will not exceed the criterion of harmfulness, the activity of the executable file will not be recognized as malicious, and consequently the malicious file will not be detected.

The graph 310 shows the dynamics of monotonic change in the degree of harmfulness as a function of the number of behavior patterns formed during the execution of a malicious file.

In the beginning, upon executing said file, the number of behavior patterns formed is not large, and what is more the malicious activity of the executable file might be absent or minimal (for example, an initialization of data occurs, which is peculiar to many files, including safe ones), so that the calculated degree of harmfulness differs slightly from 0 and does not exceed the predetermined threshold value (hereinafter, the criterion of safety), but upon exceeding this the behavior of the executable file ceases to be considered safe (on the graph, this threshold value is designated by a broken line 312).

However, further along the execution the malicious activity of the executable file grows and the degree of harmfulness begins to approach 1, surpassing the criterion of safety, while the degree of harmfulness might not reach the predetermined threshold value (hereinafter, the criterion of harmfulness), but upon exceeding this the behavior of the executable file will be considered to be malicious (in the graph, this threshold value is designated by a dashed line 314).

After a period of growth (points A-B), the malicious activity may cease (points B-A) yet the degree of harmfulness will not decline, but only continue to grow during any malicious activity of the executable file. At a certain point, the degree of harmfulness will become greater than the criterion of harmfulness (point D) and the behavior of the executable file will be recognized as malicious and consequently the file itself will be recognized as malicious.

The point of recognizing the file as malicious might occur immediately after the manifesting of malicious activity, since the described approach responds well to a steady growth in the degree of harmfulness, which occurs both during prolonged, clearly manifested malicious activity of the executable file, and during frequent, episodic, less-pronounced malicious activity.

In the event that the malicious activity occurs episodically (left side of the graph 310), the calculated degree of harmfulness over point-of-execution might reach the value after which a verdict is pronounced as to the harmfulness of the behavior of the executable file and the harmfulness of the executable file itself.

In the case when the degree of harmfulness is calculated not on the basis of each behavior pattern formed (for example, because the performance of the computing device is poor), a situation is possible where the degree of harmfulness will be calculated at point A (when the malicious activity commences) and point C (when the malicious activity ends), but will not be calculated at point B (when malicious activity is occurring), nevertheless since the degree of harmfulness changes monotonically, the calculated degrees of harmfulness will only increase their values and at point C the degree of harmfulness will exceed the criterion of harmfulness, the activity of the executable file will be recognized as malicious, and consequently the malicious file will be destroyed.

As shown in FIG. 3A, the graph 320 illustrates the dynamics of an arbitrary change in the degree of harmfulness as a function of the number of behavior patterns formed during the execution of a safe file.

In the beginning, upon executing said file, the number of behavior patterns formed is not large, and what is more there is no malicious activity as such for the executable file, although "suspicious" commands might be executed, which are also executable during the execution of malicious files (for example, deletion of files, transfer of data in a computer network, and so on), therefore the calculated degree of harmfulness differs from 0 and does not exceed the predetermined threshold value (hereinafter, the criterion of safety), but upon exceeding this the behavior of the executable file ceases to be considered safe (in the graph, this threshold value is designated by a broken line 322).

However, in time the malicious activity of the executable file grows on account of the execution of a large number of "suspicious" commands and the degree of harmfulness begins to approach 1, while the degree of harmfulness might not reach the predetermined threshold value (hereinafter, the criterion of harmfulness), but upon exceeding this the behavior of the executable file will be considered to be malicious (in the graph, this threshold value is designated by a dashed line 324), but it might exceed the criterion of safety, so that the file may cease to be considered safe and becomes "suspicious".

After a period of growth, the malicious activity may cease and the degree of harmfulness will again approach 0 (point C).

In the case when the degree of harmfulness is calculated not on the basis of each behavior pattern formed (for example, because the performance of the computing device is poor), a situation is possible where the degree of harmfulness will be calculated at point B (when the activity is most similar to malicious, i.e., becomes "suspicious") but not at point A (when the "suspicious" activity increases) or at point C (when the "suspicious" activity is decreasing), so that the calculated degree of harmfulness will exceed the criterion of safety, the activity of the executable file will be recognized as "suspicious" (it will not be considered safe), and consequently the safe file will not be recognized as safe.

The graph 330 shows the dynamics of monotonic change in the degree of harmfulness as a function of the number of behavior patterns formed during the execution of a safe file. In the beginning, upon executing said file, the number of behavior patterns formed is not large, and what is more there is no malicious activity as such for the executable file, although "suspicious" commands might be executed, which are also executable during the execution of malicious files (for example, deletion of files, transfer of data in a computer network, and so on), therefore the calculated degree of harmfulness differs from 0 and does not exceed the predetermined threshold value (hereinafter, the criterion of safety), but upon exceeding this the behavior of the executable file ceases to be considered safe (in the graph, this threshold value is designated by a broken line 322).

However, in time the malicious activity of the executable file grows on account of the execution of a large number of "suspicious" commands and the degree of harmfulness begins to approach 1, while the degree of harmfulness might not reach the predetermined threshold value (hereinafter, the criterion of harmfulness), but upon exceeding this the behavior of the executable file will be considered to be malicious (in the graph, this threshold value is designated by a dashed line 324), and also it might not exceed the criterion of safety, so that the file will continue to be considered safe.

After a period of growth (points A-B), the malicious activity may cease (points B-A) yet the degree of harmfulness will not decline, but only continue to grow during any malicious activity of the executable file, yet not exceed the coefficient of safety, so that the activity of the executable file will be recognized as safe and consequently the file will be recognized as safe.

In the case when the degree of harmfulness is calculated not on the basis of each behavior pattern formed (for example, because the performance of the computing device is poor), a situation is possible where the degree of harmfulness will be calculated at point B (when the activity is most similar to malicious, i.e., becomes "suspicious") but not at point A (when the "suspicious" activity increases) or at point C (when the "suspicious" activity decreases), nevertheless since the degree of harmfulness changes monotonically, the calculated degrees of harmfulness will only increase their values, at points A, B and C the degrees of harmfulness will not exceed the criterion of safety, the activity of the executable file will be recognized as safe, and consequently the safe file will be recognized as safe.

The time of recognizing the file as "suspicious" might not occur after the manifesting of "suspicious" activity, since the described approach affords a steady growth in the degree of harmfulness, which makes it possible to avoid sharp peaks in the growth of the degree of harmfulness.

Figure 4:
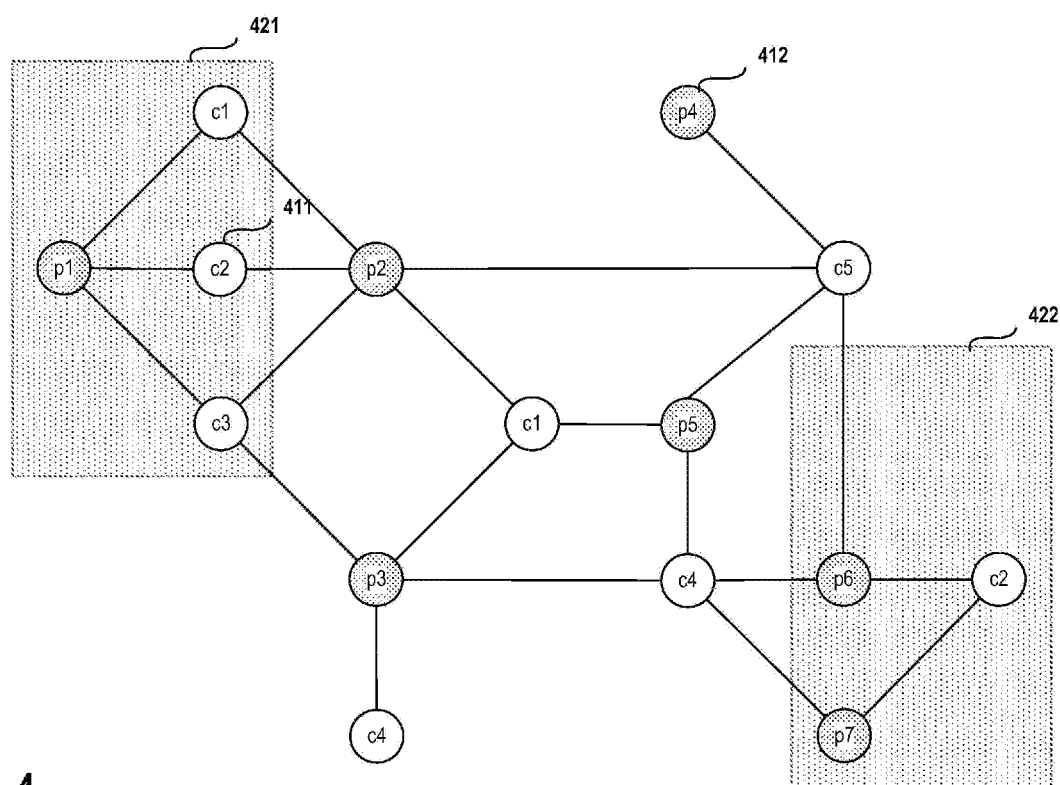
FIG. 4 shows an example of the diagram of relations between elements of behavior patterns according to an exemplary aspect.

FIG. 4 shows an example of the diagram of relations between elements of behavior patterns according to an exemplary aspect. The example of the diagram of relations between elements of behavior patterns includes commands 411 (depicted as clear circles), parameters 412 (depicted as hatched circles), an example of a behavior pattern 421 with one parameter, and an example of a behavior pattern 422 with one command.

During the execution of a file, the commands 411 were intercepted and the parameters 412 describing them were determined:

CreateFile 0x24e0da54 '.dat'
{c1, p1, p2}
ReadFile 0x24e0da54 '.dat'
{c2, p1, p2}
DeleteFile 0x24e0da54 '.dat' 'c:\'
{c3, p1, p2, p3}
CreateFile 0x708a0b32 '.dat' 0x3be06520
{c1, p2, p3, p5}
WriteFile 0x708a0b32
{c4, p3}
WriteFile         0x708a0b32         0x3be06520 0x9902a18d1718b5124728f9 0
{c4, p3, p5, p6, p7}
CopyMemory 0x3be06520 0x9902a18d1718b5124728f9
{c5, p4, p5, p6}
ReadFile 0x9902a18d1718b5124728f9 0
{c2, p6, p7}

On the basis of the mentioned commands 411 and parameters 412, behavior patterns (421, 422) are formed and the relations between the elements of the behavior patterns are determined.

In a first step, patterns are formed containing one command 411 and one parameter 412 describing that command:

{c1, p1}
{c1, p2}
{c1, p3}
{c1, p5}
{c2, p1}
{c2, p2}
{c2, p6}
{c2, p7}
{c3, p1}
{c3, p2}
{c3, p3}
{c4, p3}
{c4, p5}
{c4, p6}
{c4, p7}
{c5, p4}
{c5, p5}
{c5, p6}

In the example shown, 19 behavior patterns have been formed on the basis of 8 intercepted commands (with the parameters describing them).

In the second step, patterns are formed which contain one parameter 412 and all the commands 411 which can be described by that parameter 412:

| {c1, c2, c3, p1} | {c1, c2, c3, p2} |
| {c1, c4, c5, p5} | {c5, p4} |
| {c2, c4, c5, p6} | {c2, c4, p7} |
| {c1, c3, c4, p3} | |

In the example shown, seven (7) behavior patterns have been formed in addition on the basis of 8 intercepted commands (with the parameters describing them).

In the third step, patterns are formed which contain several parameters 412 and all the commands 411 which can be described by those parameters 412:

| {c1, c2, c3, p1, p2} | {c2, c4, p6, p7}. |
| {c4, c5, p5, p6} | |

In the example given, three (3) behavior patterns have been formed in addition on the basis of 8 intercepted commands (with the parameters describing them). As shown, a pattern may comprise a set of parameters. For example, {c1, c2, c3, p1, p2} is a pattern that contains the parameters, c1, c2, c3, p1, and p2.

Figure 6:
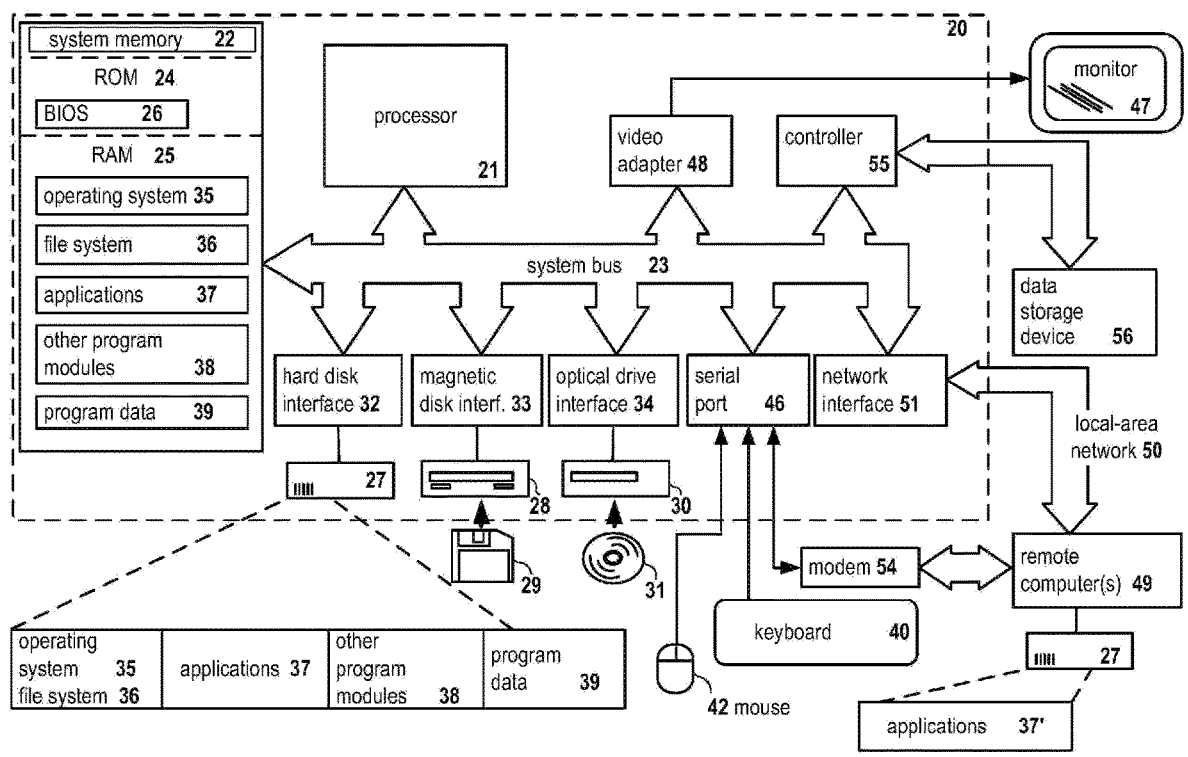
FIG. 6 is a block diagram of a general-purpose computer system on which the disclosed system and method can be implemented according to an exemplary aspect.

FIG. 6 is a block diagram illustrating a general-purpose computer system 20 on which aspects of systems and methods for machine learning of a model for detecting malicious files may be implemented in accordance with an exemplary aspect. It should be noted that the computer system 20 can correspond to the system 100, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for machine learning of a model for detecting malicious files, wherein the method comprises:
    selecting a first file from a database of files as a training sample;
    generating a behavior log based on executable commands intercepted during execution of the selected first file;
    generating a plurality of behavior patterns based on the behavior log;
    determining a hash function by changing parameters of known invertible hash functions and based on types of elements of the behavior patterns such that, when a first result is obtained by applying the hash function to the behavior pattern, a second result is obtained by applying an inverse of the hash function to the obtained first result, and a degree of similarity of the second result and the generated behavior patterns is greater than a specified first value, wherein the types of elements of the behavior patterns include: a first type for strings, a second type for numbers, and a third type for behavior patterns other than strings and numbers;
    training a detection model for detecting malicious files by calculating a plurality of parameters of the detection model using the hash function on the behavior patterns; and
    detecting that a second file is a malicious file using the trained detection model on a system behavior log generated during an execution of the second file.

2. The method of claim 1, wherein the detection model comprises a set of rules configured to calculate a degree of harmfulness of a target file based on at least one behavior pattern using calculated parameters of the detection model.

3. The method of claim 1, wherein generating the behavior log based on the executable commands intercepted during the execution of the selected first file further comprises:
    intercepting at least one executable command at least during execution of the selected first file or emulation of the execution of the selected first file;
    determining, for each intercepted command, at least one parameter describing the command; and
    generating the behavior log associated with the selected first file based on the intercepted commands and the parameters.

4. The method of claim 1, wherein each of the behavior patterns comprise a set of at least one command and a parameter which describes all of the commands of that set.

5. The method of claim 1, wherein, for each behavior pattern, the hash function is configured to calculate a feature vector of the behavior pattern as a sum of hash sums of elements of that behavior pattern.

6. The method of claim 1, further comprising:
    calculating a degree of harmfulness of the second file based on the behavior log and the detection model, the degree of harmfulness of the second file being a quantitative characteristic describing malicious behavior of the second file.

7. The method of claim 1, wherein detecting that the second file is a malicious file using the trained detection model on the system behavior log generated during execution of the second file further comprises:
    recording intercepted executable commands and parameters with the intercepted commands into the system behavior log;
    calculating a coefficient of harmfulness using the trained detection model on the system behavior log; and
    determining that the second file is a malicious file responsive to determining that the coefficient of harmfulness exceeds a first threshold value.

8. A system for machine learning of a model for detecting malicious files, wherein the system comprises:
    a hardware processor of a computing device configured to:
        select a first file from a database of files as a training sample;
        generate a behavior log based on executable commands intercepted during execution of the selected first file;
        generate a plurality of behavior patterns based on the behavior log;
        determine a hash function by changing parameters of known invertible hash functions and based on types of elements of the behavior patterns such that, when a first result is obtained by applying the hash function to the behavior pattern, a second result is obtained by applying an inverse of the hash function to the obtained first result, and a degree of similarity of the second result and the generated behavior patterns is greater than a specified first value, wherein the types of elements of the behavior patterns include: a first type for strings, a second type for numbers, and a third type for behavior patterns other than strings and numbers;

train a detection model for detecting malicious files by calculating a plurality of parameters of the detection model using the hash function on the behavior patterns; and detect that a second file is a malicious file using the trained detection model on a system behavior log generated during an execution of the second file.

9. The system of claim 8, wherein the detection model comprises a set of rules configured to calculate a degree of harmfulness of a target file based on at least one behavior pattern using calculated parameters of the detection model.

10. The system of claim 8, wherein the processor configured to generate the behavior log based on the executable commands intercepted during the execution of the selected first file is further configured to:

intercept at least one executable command at least during execution of the selected first file or emulation of the execution of the selected first file;

determine, for each intercepted command, at least one parameter describing the command; and generate the behavior log associated with the selected first file based on the intercepted commands and the parameters.

11. The system of claim 8, wherein each of the behavior patterns comprise a set of at least one command and a parameter which describes all of the commands of that set.

12. The system of claim 8, wherein, for each behavior pattern, the hash function is configured to calculate a feature vector of the behavior pattern as a sum of hash sums of elements of that behavior pattern.

13. The system of claim 8, wherein the processor is further configured to:

calculate a degree of harmfulness of the second file based on the behavior log and the detection model, the degree of harmfulness of the second file being a quantitative characteristic describing malicious behavior of the second file.

14. The system of claim 8, wherein the processor configured to detect that the second file is a malicious file using the trained detection model on the system behavior log generated during execution of the second file is further configured to:

record intercepted executable commands and parameters with the intercepted commands into the system behavior log;

calculate a coefficient of harmfulness using the trained detection model on the system behavior log; and determine that the second file is a malicious file responsive to determining that the coefficient of harmfulness exceeds a first threshold value.

15. A non-transitory computer readable medium comprising computer executable instructions for machine learning of a model for detecting malicious files, including instructions that, when executed by one or more computer processors, cause the one or more computer processors to perform operations comprising:

selecting a first file from a database of files as a training sample;

generating a behavior log based on executable commands intercepted during execution of the selected first file;

generating a plurality of behavior patterns based on the behavior log;

determining a hash function by changing parameters of known invertible hash functions and based on types of elements of the behavior patterns such that, when a first result is obtained by applying the hash function to the behavior pattern, a second result is obtained by applying an inverse of the hash function to the obtained first result, and a degree of similarity of the second result and the generated behavior patterns is greater than a specified first value, wherein the types of elements of the behavior patterns include: a first type for strings, a second type for numbers, and a third type for behavior patterns other than strings and numbers;

training a detection model for detecting malicious files by calculating a plurality of parameters of the detection model using the hash function on the behavior patterns; and detecting that a second file is a malicious file using the trained detection model on a system behavior log generated during an execution of the second file.

16. The computer readable medium of claim 15, wherein the detection model comprises a set of rules configured to calculate a degree of harmfulness of a target file based on at least one behavior pattern using calculated parameters of the detection model.

17. The computer readable medium of claim 15, wherein generating the behavior log based on the executable commands intercepted during the execution of the selected first file further comprises:

intercepting at least one executable command at least during execution of the selected first file or emulation of the execution of the selected first file;

determining, for each intercepted command, at least one parameter describing the command; and generating the behavior log associated with the selected first file based on the intercepted commands and the parameters.

18. The computer readable medium of claim 15, wherein each of the behavior patterns comprise a set of at least one command and a parameter which describes all of the commands of that set.

19. The computer readable medium of claim 15, wherein, for each behavior pattern, the hash function is configured to calculate a feature vector of the behavior pattern as a sum of hash sums of elements of that behavior pattern.

20. The computer readable medium of claim 15, further comprising:

calculating a degree of harmfulness of the second file based on the behavior log and the detection model, the degree of harmfulness of the second file being a quantitative characteristic describing malicious behavior of the second file.

21. The computer readable medium of claim 15, wherein detecting that the second file is a malicious file using the trained detection model on the system behavior log generated during execution of the second file further comprises:

recording intercepted executable commands and parameters with the intercepted commands into the system behavior log;

calculating a coefficient of harmfulness using the trained detection model on the system behavior log; and determining that the second file is a malicious file responsive to determining that the coefficient of harmfulness exceeds a first threshold value.

* * * * *